United States Patent

Froschle

BEST AVAILABLE COPY

[15] 3,663,752

[45] May 16, 1972

[54] OPTICAL BULK STORAGE ARRANGEMENT FOR A DIGITAL COMPUTER

[72] Inventor: Ernst Froschle, Friedrichstr. 42, Aachen, Germany

[22] Filed: Oct. 21, 1969

[21] Appl. No.: 868,016

[30] Foreign Application Priority Data

Oct. 23, 1968 Germany ......................P 18 04 756.8

[52] U.S. Cl. ........................................178/7.2, 235/61.11 R

[51] Int. Cl. ..........................................................G06k 7/00

[58] Field of Search ..............235/61.11 R, 61.11 E, 61.11 G; 250/219 Q, 219 D, 219 DR; 178/7.2, DIG. 29

[56] References Cited

UNITED STATES PATENTS

| | | | |
|---|---|---|---|
| 2,349,656 | 5/1944 | Gulliksen | 250/219 |
| 2,964,590 | 12/1960 | Gillette | 178/DIG. 29 |
| 3,450,833 | 6/1969 | Hobrough | 178/DIG. 29 |

*Primary Examiner*—Robert L. Griffin
*Assistant Examiner*—George G. Stellar
*Attorney*—Spencer & Kaye

[57] ABSTRACT

An optical bulk storage arrangement for a digital computer comprising an information carrier, an image of which is projected by means of objective lens means onto a camera device, e.g.: a television camera tube, having means for temporarily storing the image, means for varying the position of the focal plane of the objective lens means relative to the information carrier between two exposures of the camera device and means for initiating an exposure when the focal plane is just passing through the information carrier.

16 Claims, 6 Drawing Figures

BEST AVAILABLE COPY

*Inventor:*
Ernst Fröschle
BY Spencer & Kaye
ATTORNEYS.

BEST AVAILABLE COP

Inventor:
Ernst Fröschle

BY Spencer & Kaye
ATTORNEYS.

OPTICAL BULK STORAGE ARRANGEMENT FOR A DIGITAL COMPUTER

BACKGROUND OF THE INVENTION

The invention relates to an optical bulk store for digital computers which permits rapid direct access to large quantities of information, the information carrier of which can be replaced relatively quickly under computer control.

Optical bulk stores are particularly suitable for storing large quantities of information (more than $10^9$ bits) because considerably more information can be accommodated with the same area of information carrier than, for example, magnetic stores. Pattern dots of 1 $\mu$m diameter can be produced with high-resolution photolacquers or by burning holes in plastic films. Allowing for the necessary spaces between the individual lines of information as well as the space requirements for coding and identifying the store location, about $2.10^7$ to $4.10^7$ bits can be stored per cm$^2$.

Hitherto, however, such high store densities have only been achieved with tape storage equipment wherein the storage tape is displaced uniformly at a slow speed (for example 2 mm per second) and the microscope objective used for reading rotates at a constant speed (for example 480 rpm) (1). Through very precise construction of the mechanism it is possible to ensure that the spacing between information carrier and objective fluctuates by less that $\pm$ $5\times10^{-5}$ cm. With greater fluctuations in this spacing, the reproduction would become so unsharp that adjacent pattern dots of 1 $\mu$m could no longer be separated. With tape equipment, however, the mean access time is very high because a large proportion of the tape generally has to be rewound when passing from one point on the tape to another. Devices in which film strips of, for example, 2 $\times$ 20 cm$^2$ are used instead of a tape provide a shorter access time. 500 of these strips with a total of $3.5\times10^8$ bits are stored in a shelf-like device in such a manner that any desired strip can be brought into a reading device in about 2 seconds by means of a suitable hydraulic conveying device. The scanning of the strip is effected by the "flying spot" principle with a flying spot scanning tube. Some of the $7\times10^5$ bits on the strip can be read with an access time of a few $10^{-5}$ seconds; for the rest, the film strip is displaced mechanically.

Modern magnetic disc file installations have maximum access times of 15 to 150 msec and storage capacities of $4\times10^7$ bits to $2\times10^9$ bits. In contrast to the optical stores described, transcription is also possible, that is to say the information carrier can be cleared and rewritten.

An optical bulk store which could compete would therefore have to have a storage capacity of $10^8$ to $10^9$ bits with an access time which is equal to or less than that of the magnetic disc file. As already shown when discussing optical tape stores, there is no problem is accommodating this amount of information on a relatively small information carrier. With a pattern dot size of 1 $\mu$m, between $5\times10^8$ and $1\times10^9$ bits can be written on an area of, for example, 5 $\times$ 5 cm$^2$. It is practically impossible, however, to build a mechanism which will displace the information carrier by 5 cm in two directions within 10 msec to 100 msec and at the same time maintain the spacing between microscope objective and information carrier constant at $\pm$ 0.5 $\mu$m.

SUMMARY OF THE INVENTION

It is therefore the object of the invention to build a high-speed optical bulk store so that satisfactory reading of the information is possible with pattern dot diameters of 1 $\mu$m even with relatively wide tolerance for the movement of the device.

According to the invention, there is provided an optical bulk storage arrangement for electronic computers comprising an information carrier, a camera device, an objective lens means for providing in said camera an image of said information carrier, means in said camera for temporarily storing said image, means for causing said temporary storage means to be exposed to said image, means for storing the image for a certain time, means for varying the position of the focal plane of said objective lens means relative to said information carrier between two exposures of said camera device, and means for initiating the exposure of said camera device when said focal plane is just passing through said information carrier.

BRIEF DESCRIPTION OF THE DRAWINGS

The invention will now be described in greater detail, by way of example, with reference to the accompanying drawings, in which.

DESCRIPTION OF THE PREFERRED EMBODIMENTS

Figure 1:
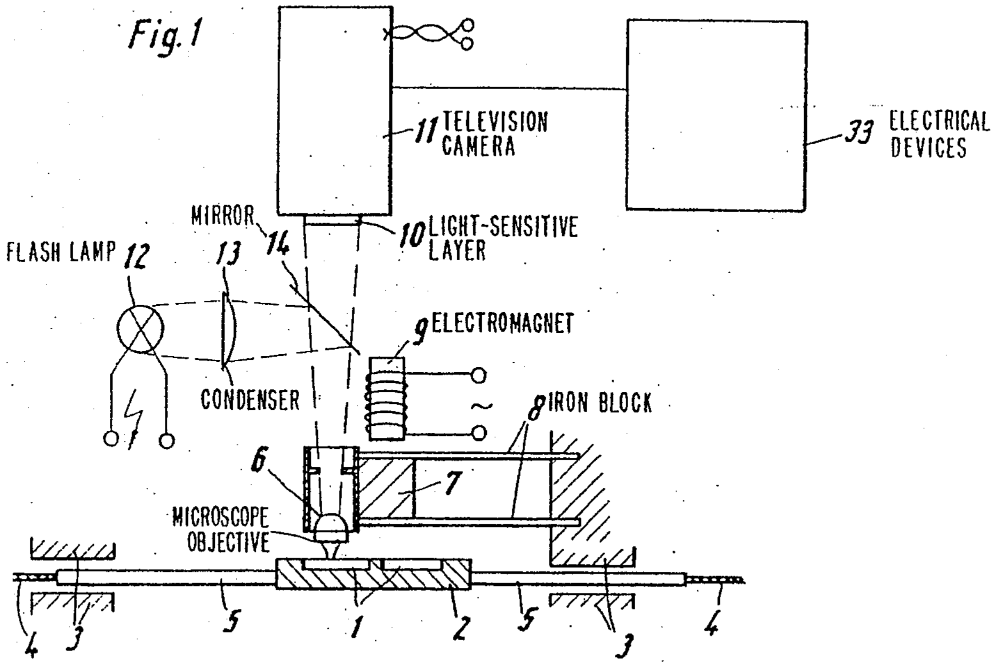
FIG. 1 shows diagrammatically a section through an optical bulk storage arrangement in accordance with the invention.

Basically, according to the preferred embodiment of the invention an optical bulk storage arrangement for electrical computers is proposed wherein the image of an information carrier is reproduced with a suitable objective on a camera, preferably a television pick up tube, for reading out the information. This arrangement should be built in such a manner that devices are provided for varying the position of the focal plane of the objective in relation to the information carrier preferably periodically between two exposures and for making the exposure briefly when the focal plane is just passing through the information carrier. The focal plane of the objective is understood to mean that plane which is reproduced sharply by the objective on the camera device. In this manner, sharp reproductions of the information carrier can be obtained on the camera device even when the spacing between objective and information carrier fluctuates as a result of mechanical tolerances or vibrations.

The position of the focal plane in relation to the information carrier can be varied most simply by the microscope objective periodically executing fluctuations in height of $\pm$ 0.1 mm, for example, at a frequency $f$. In special cases, however, it may be preferable to move the information carrier instead, or to incorporate appropriate variable members in the optical path of rays.

Normal microscope objectives should easily withstand 10 times the acceleration due to gravity and particularly stable constructions should withstand more than 100 times the acceleration due to gravity in continuous operation. With an amplitude of $\pm$ 0.1 mm this corresponds in the first case to an oscillation frequency of about 160 cps and a maximum velocity of 0.1 m/sec, in the second case about 500 cps and 0.3 m/sec. In order to resolve pattern dots of 1 $\mu$m diameter satisfactorily, a well corrected objective with the numerical aperture 0.5 is necessary. The focal plane should deviate at most by $\pm$ 0.5 $\mu$m from the plane of the information carrier. This means that the exposure time in the above examples must be less than 10 $\mu$sec or less than 3 $\mu$sec, respectively. Since the maximum sharp focusing range, if the aperture is reduced in accordance with the lower requirements regarding the resolving power, is proportional to the square of the pattern dot size, longer exposure times up to about 1,000 $\mu$sec are therefore permissible for larger pattern dots.

If a sensitive television pickup tube is used as a camera device, the luminous intensity of mercury or xenon superpressure lamps (luminance $10^5$ lumen/cm$^2$) is sufficient to set the exposure time by means of an electrical shutter or by suitable voltage pulses at the television pickup tube. Taking all losses into consideration therefore, for the example described later, for an objective having the numerical aperture 0.5 and an exposure time of 5 μsec for the picture repetition frequency of 25 cps usual in television cameras, there is a mean luminous flux of about 1 millilumen. Unless there are special reasons in favor of this solution, however, such as longer life of the light source or fewer electrical disturbances, the required short exposure time can be obtained more easily by appropriate light pulses from flash-light tubes, sparks or pulsed lasers.

Figure 2:
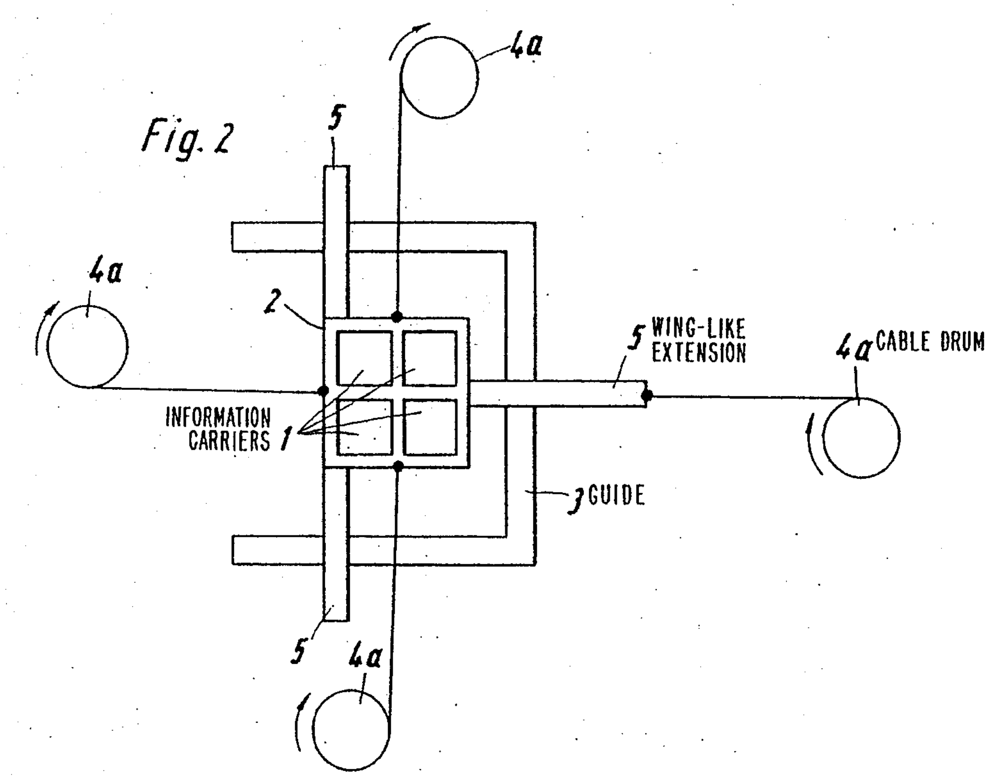
FIG. 2 is a plan view of the mechanical part of the arrangement of FIG. 1 with the upper portion of the guide removed.

Referring now to the drawings, FIG. 1 shows diagrammatically a section through an embodiment of the invention. Since it is an advantage for the optical critical focusing device (to be described later), an optical arrangement in the manner of an incident-light microscope is used. The information carriers 1 (for example photoplates) lie so as to be easily replaced but being firmly held on the transport carriage 2 which can be displaced rapidly in the two directions perpendicular to the plane of the drawing, for example in the guides 3 by means of cable lines 4. FIG. 2 shows diagrammatically the plan view of this mechanical part of the device wherein the upper portion of the guides 3 is removed. The four cable drums 4*a* are braked through electromagnetically actuated friction clutches (not shown), being controlled by the computer, or are pulled in the direction indicated by traction motors (not shown). The carriage 2 has for example three wing-like extensions 5 which slide between two U-shaped guides 3. If there is constant acceleration by a value *b* during the first half of the carriage movement and constant braking by the same value *b* during the second half, then for a displacement of 7 cm within 10 ms, 300 times the acceleration due to gravity must act on the carriage. If the weight of the carriage with the information carriers mounted thereon is 50 grams, which should be possible with a carriage area of 7 × 7 $cm^2$, the tensile forces amount to 15 kpond and can therefore easily be transmitted by steel cables with a cross-section of 1 $mm^2$. Since the tensile forces rise in inverse proportion to the square of the setting time, special mechanical constructions are necessary for considerably shorter setting times.

It can easily be seen that such accelerations can only be utilized if wide mechanical tolerances are permitted, because of the inevitable vibrations which occur. By using the constructional means set out herein, the information carrier may still have residual speeds of about 0.1 m/sec at the moment of readout. Its height may fluctuate by ± 0.1 mm and the displacement of the carriage in the *x* direction and *y* direction need only be accurate to ± 0.2 mm.

The optical device for reading out the information consists of the microscope objective 6 (for example heating stage objective, aperture 0.5 with a high working distance and corrected to the thickness of the glass layer of the information carrier), which is held by a block of iron 7 and two lead springs 8. By means of the electromagnet 9, it can be displaced periodically by ± 0.1 mm in height at 160 cps. When the information of the information carrier 1 is sharply reproduced on the light-sensitive layer 10 of the television camera 11, an electrical pulse is produced by the measuring device for the critical focusing and fires the light pulse emitting device 12. Device 12 is any one of a flash lamp, spark gap, and pulsed lazer. The information carrier is illuminated for about 5 μsec through the condenser 13, the partially reflecting mirror 14 and the objective 6, and its image is retained by the storage layer of the television camera.

Figures 3, 4, 5, 6:
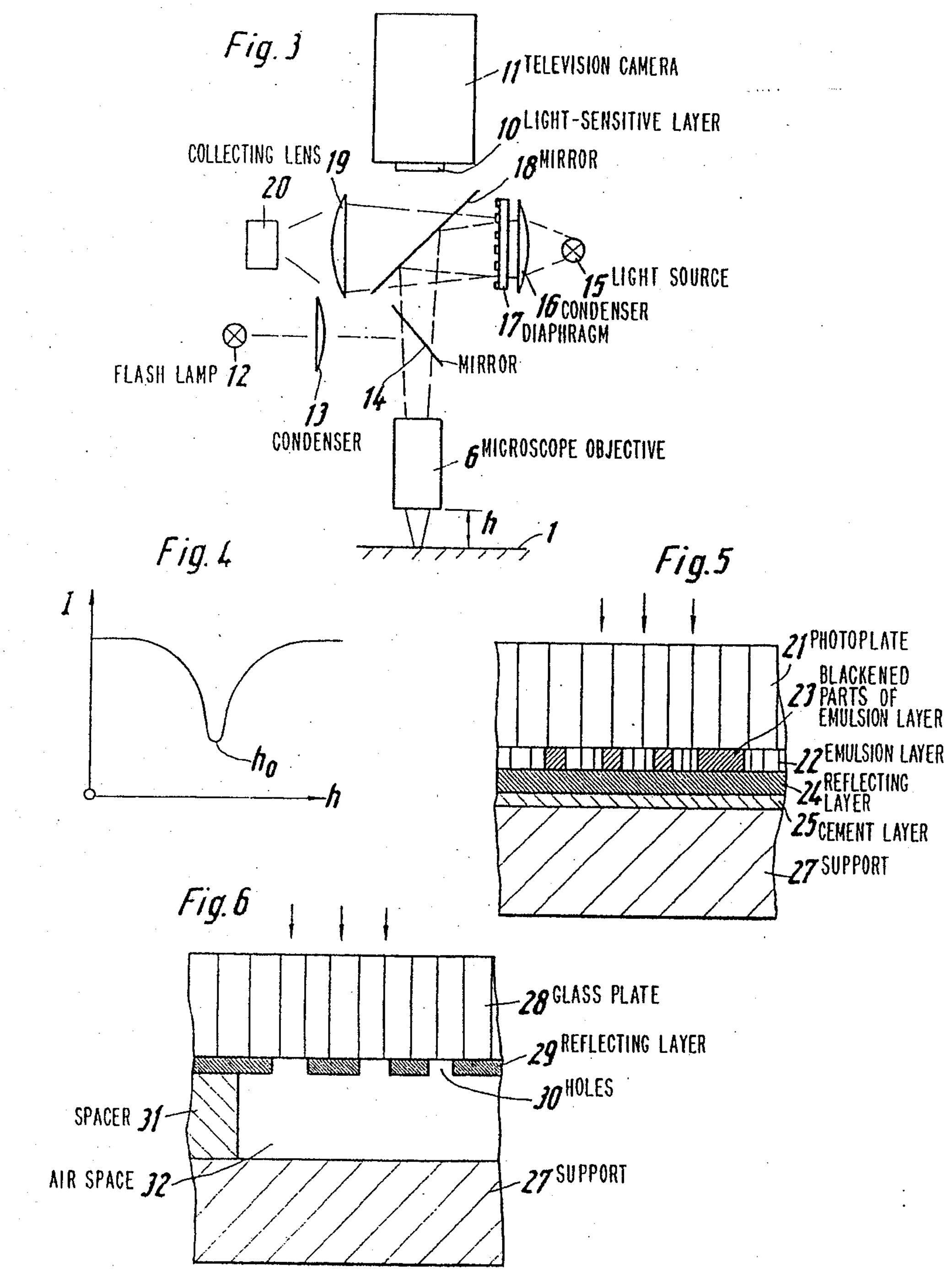
FIG. 3 shows diagrammatically an arrangement for detecting when the focal plane of the objective lens of FIG. 1 lies in the plane of the information carrier.
FIG. 4 is a graph showing intensity of light reflected from the diaphragm of FIG. 3 against the distance between the objective lens and the information carrier.
FIG. 5 is a sectional view of one form of information carrier.
FIG. 6 is a sectional view of another form of information carrier.

In order to determine the precise moment when the information carrier 1 is just reproduced sharply on the light sensitive layer 10 of the television camera, it is an advantage to use an autocollimating device as shown in FIG. 3. A diaphragm 17 which is illuminated from a continuously operating light source 15, through the condenser 16, is reproduced on the information carrier 1 through a further partially reflecting mirror 18 and the microscope objective 6. With critical focusing, the light reflected back or scattered back from the information carrier 1 falls substantially back in the aperture in the diaphragm 17 and not on the diaphragm itself. If the focusing is not sharp, however, a large proportion of the reflected light falls on the diaphragm 17. Some of this can be focused onto the photoelectric cell 20 through the collecting lens 19. Its photocurrent is therefore a measure of the distribution of the reflected light between diaphragm and diaphragm aperture. As FIG. 4 shows, depending on the distance *h* between objective 6 and information carrier 1, it has a minimum at $h = h_0$ when the diaphragm is just reproduced sharply on the information carrier. This minimum or one flank thereof can be used to trigger the flash lamp 12. In the first case, the optical distance of the objective 6 from the diaphragm 17 and the light sensitive layer 10 must be equal if the image of the information carrier is to be reproduced sharply on the light sensitive layer 10 of the television camera when the flashlight is released. In the second case, an appropriate slight displacement is necessary.

The ray paths for images and sharp focussing can be separated, for example, by spectral filters.

The diaphragm may advantageously be constructed in the form of a mirror which contains, for example, a grid of alternately reflecting and transmissive strips or other patterns such as a large number of reflecting or transmissive circular discs, the smallest dimensions of which, after reproduction by the objective on the information carrier, corresponds substantially to the pattern dot dimensions. With smaller dimensions, the minimum is only slightly pronounced, with larger ones it is very broad.

In order to obtain high luminous intensities, the information carrier for the method described should be so constructed that it has a reflecting layer which reflects the incidient light almost completely back into the objective at the points not provided with information characteristics. With photoplates and films this can be achieved by coating the emulsion side with a reflecting metallic layer by vapor-deposition or chemically after the development process. The procedure may, however be different, and a glass plate may be mirrored on one side and the information stored in the form of holes in the reflecting layer by photolithographic etching processes or by burning in with a laser beam. FIG. 5 and FIG. 6 show examples of embodiments of such information carriers in section. In FIG. 5, a photoplate 21 of, for example, 30 × 30 × 1 mm is provided with a reflecting layer 24 over its emulsion layer 22 and stuck to a base 27 with the cement layer 25 for protection. The information is stored in the blackened parts 23 of the emulsion which act like dark points on the mirror 24 when observed from above. FIG. 6 shows a glass plate 28 vapor-deposition with a reflecting layer 29. The information is stored in the reflecting layer 29 in the form of holes 30 which may be burnt in with a laser beam, for example. In order that the metal in the reflecting layer may evaporate without hindrance, the support 27 is separated by an air space 32, for example a few tenths of a millimeter thick, adjusted by means of the spacer 31. With this information carrier, additional information may be burnt in subsequently with the laser beam.

A further problem is the readout of the stored image from the television pickup tube. The complete scanning of the image field, as is usual with television pictures, requires about 20 msec to 40 msec. During the readout, the stored image is deleted simultaneously if aftereffect phenomena are disregarded. The storage field therefore normally has to be scanned completely. Since aftereffects are fundamentally unavoidable with Vidicon tubes, these should only be used for relatively slow storage devices. A short access time necessitates superorthicon tubes or supericonoscope tubes. It is accordingly proposed that electrical devices 33 should be provided firstly to scan the entire image field of the television pickup tube quickly before the exposure and secondly to scan the interesting parts of the image field with the required information, preferably in lines which can be selected by the computer, after the exposure. The scanning before the exposure may be effected simultaneously with the mechanical displacement of the information carrier, for example, so that no additional

BEST AVAILABLE COP time is needed. During this scanning, it is an advantage to use a greatly increased beam current and large beam diameter because, after all, it is only a question of scanning the entire storage field of the television pickup tube. During the actual reading operation after the exposure, as fine a beam as possible is set and with it for example, individual lines are scanned. Thus, the computer can identify the line number entered at the beginning of the line and calculate the current for the vertical deflection which is necessary to readout the required line.

Normally, the information for the method discussed is stored on the information carrier in lines of 200 to 600 pattern dots which include the line number in binary form at the beginning, for example, and are separated from the following line by a space. If the lines of information extend obliquely to the direction of the scanning beam, this jumps from one line to another during the scanning. This disturbing effect can be prevented in the following manner, for example: a high-frequency alternating current, for example of the frequency 20 Mcps of such an intensity that the scanning beam is deflected through about ± 0.5 line widths, is superimposed on the current for the vertical deflection. Some of the output signal from the picture tube is rectified with phase control by this current and so gives a signal which is positive, for example, when the scanning beam is above the middle of the information line for an average time and negative when it is below the middle of the information line. After amplification, this signal may be superimposed appropriately on the vertical deflection current, thus ensuring that the deflection beam follows the middle of the information line even when this is oblique or curved.

The finding of information on the storage screen of the television pickup tube should take at most one millisecond. The maximum access time in the proposed device is therefore practically determined only by its mechanical limits, for which only very low tolerance requirements are made, however. Maximum access times of 20 milliseconds (displacement 14 msec, height 5 msec, readout 1 msec) to a storage volume of $5\times10^8$ to $1\times10^9$ bits should thus be possible relatively easily and those below 10 milliseconds with appropriate mechanical expenditure.

The above quantity of information requires only little space. It may be stored, for example, on four glass plates $30 \times 30 \times 1.5$ mm$^3$. 10,000 such plates with a total of $1\times10^{12}$ to $2.5\times10^{12}$ bits of information can be accommodated in a shelf-like device of 1 m$^2$ area. With a suitable, computer-controlled mechanism it should therefore easily be possible to extract any desired plate therefrom within 3 seconds and to insert it in the transport carriage 1 of the bulk store described above. It is also a particular advantage if a writing device on the laser principle is combined with the bulk store described or assembled therewith. The line deflection of the modulated laser beam could be effected, for example, by means of a rapidly rotating rotary or polygonal mirror. The transport carriage could be displaced mechanically, for example, in the direction perpendicular thereto. Since this takes place relatively slowly, the critical focusing described above could be used, in somewhat modified form, to adjust the height of the image-forming lens so that there is always sharp focusing.

What I claim as new and desire to secure by Letters Patent of the United States is:

1. An optical bulk storage arrangement for electronic computers comprising an information carrier, a camera device, an objective lens means for providing in said camera device an image of said information carrier for the readout of said objective lens means, means in said camera device for temporarily storing said image, means for causing said means for temporarily storing to be exposed to said image, means for storing a temporarily stored image for a certain time, means for varying the position of the focal plane of said objective lens means relative to said information carrier between two exposures of said camera device, and means for initiating the exposure of said camera device when said focal plane is just passing through said information carrier and storing an image in said means for storing.

2. An arrangement as defined in claim 1, wherein said camera device comprises a television pickup tube.

3. An arrangement as defined in claim 2, wherein said means for varying the position of said focal plane relative to said information carrier is operated periodically.

4. An arrangement as defined in claim 2, wherein said means for varying the position of said focal plane of said objective lens means comprises means for moving said objective lens means.

5. An arrangement as defined in claim 2, wherein the duration of a an exposure is less than 1,000 μsec.

6. An arrangement as defined in claim 5, further comprising at least one flash lamp, which lamp delivers appropriate light pulses for obtaining the short exposure time.

7. An arrangement as defined in claim 5, further comprising at least one spark gap, which spark gap delivers appropriate light pulses for obtaining the short exposure time.

8. An arrangement as defined in claim 5, further comprising at least one pulsed laser, which pulsed laser delivers appropriate light pulses for obtaining the short exposure time.

9. An arrangement as defined in claim 2, wherein the duration of an exposure is between 1 μsec and 10 μsec.

10. An arrangement as defined in claim 2, further comprising an illuminated diaphragm having an aperture and whose image is projected by said objective lens means on said information carrier and a receiver for measuring the distribution of the light reflected or scattered back from said information carrier on said diaphragm and the diaphragm aperture.

11. An arrangement as defined in claim 10, wherein said diaphragm is constructed in the form of a mirror.

12. An arrangement as claimed in claim 11, wherein said diaphragm comprises patterns of alternate transmissive and reflecting portions, the minimum dimensions of which after reproduction by said objective lens means are of the order of magnitude of a pattern dot of said information carrier.

13. An arrangement as defined in claim 11, wherein said diaphragm comprises alternate transmissive and reflecting strips, the minimum dimensions of which after reproduction by said objective lens means are of the order of magnitude of a pattern dot of said information carrier.

14. An arrangement as defined in claim 2, wherein said information carrier comprises a reflecting layer.

15. An arrangement as defined in claim 14, wherein the information is stored in said reflecting layer in the form of holes.

16. An arrangement as claimed in claim 14, wherein the information is stored in a photographic layer which is coated with a reflecting layer after development.

* * * * *